(12) United States Patent
Molina et al.

(10) Patent No.: US 7,264,016 B2
(45) Date of Patent: Sep. 4, 2007

(54) SELF-CLOSING ROTARY VALVE

(75) Inventors: Charles Molina, Irvine, CA (US); John Wojtaszek, Huntington Beach, CA (US); Vinh Vu, Lawndale, CA (US)

(73) Assignee: Brasstech, Inc., Santa Ana, CA (US)

( * ) Notice: Subject to any disclaimer, the term of this patent is extended or adjusted under 35 U.S.C. 154(b) by 295 days.

(21) Appl. No.: 10/973,214

(22) Filed: Oct. 26, 2004

(65) Prior Publication Data

US 2006/0086394 A1    Apr. 27, 2006

(51) Int. Cl.
*F16K 5/00* (2006.01)
(52) U.S. Cl. .................. 137/454.6; 137/606; 251/313
(58) Field of Classification Search ............... 137/606, 137/607, 454.6; 251/313
See application file for complete search history.

(56) References Cited

U.S. PATENT DOCUMENTS

| 31,799 | A | * | 3/1861 | Graham ..................... 251/184 |
| 2,934,091 | A | * | 4/1960 | Chapou ..................... 137/607 |
| 3,780,758 | A | * | 12/1973 | DeVries ..................... 137/454.6 |
| 5,103,857 | A | * | 4/1992 | Kuhn et al. ............ 137/315.13 |
| 5,417,348 | A | * | 5/1995 | Perrin et al. ............. 222/129.1 |
| 6,863,085 | B2 | * | 3/2005 | Marty et al. ................ 137/606 |

* cited by examiner

*Primary Examiner*—Stephen M. Hepperle
(74) *Attorney, Agent, or Firm*—Carlson, Gaskey & Olds

(57) ABSTRACT

A water dispenser assembly includes valve cartridges for controlling the flow of cold water from the cold-water inlet and the spout. Each valve cartridge includes a rotatable stem extending from a body. The water dispenser assembly includes a self-closing feature that provides for the automatic shut-off of flow of hot water responsive to release of the handle. The self-closing feature includes a spring held onto the stem by an adaptor. The self-closing feature is contained entirely within the valve cartridge and therefore does not require any modification to the housing.

8 Claims, 5 Drawing Sheets

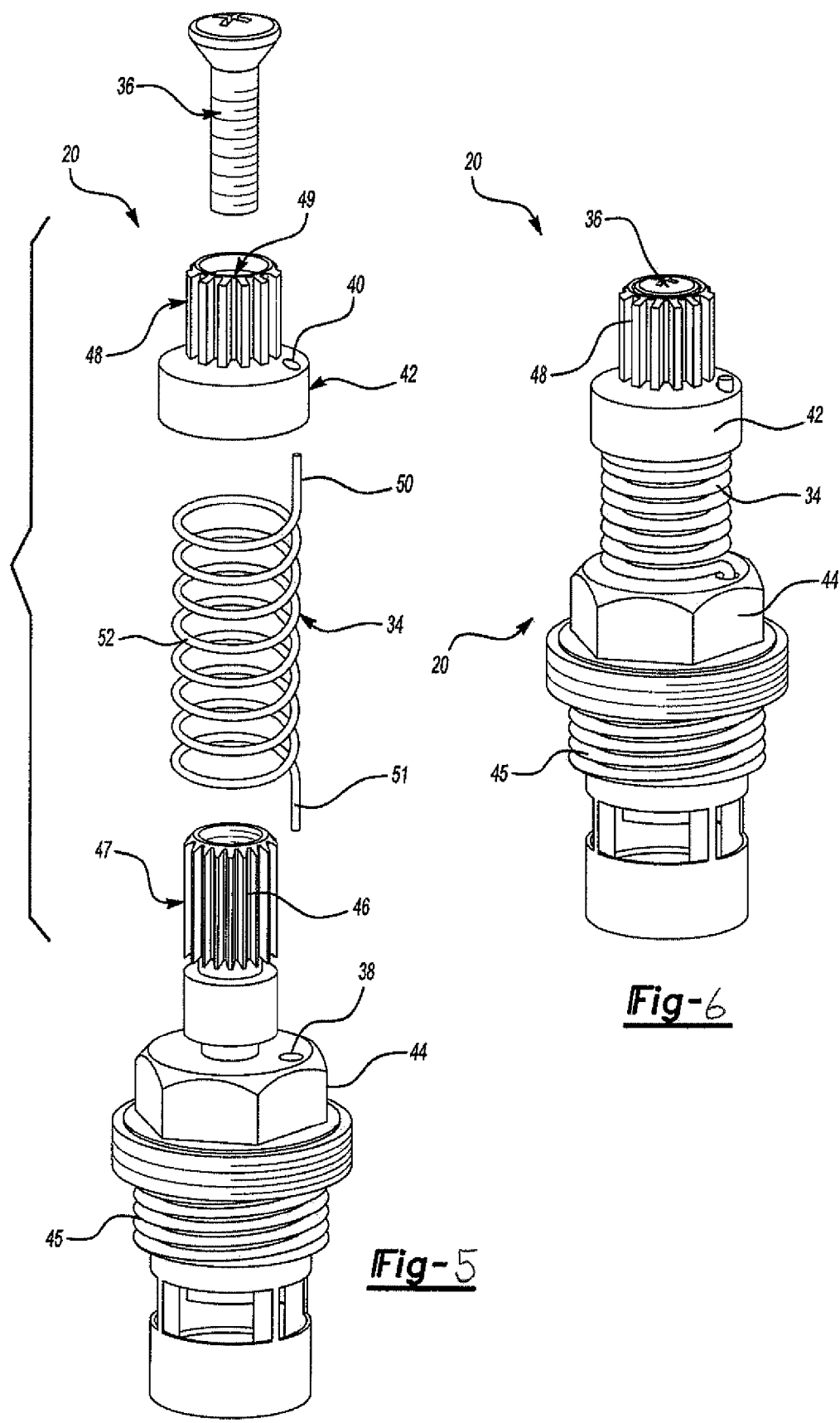

SELF-CLOSING ROTARY VALVE

BACKGROUND OF THE INVENTION

This invention generally relates to a self-closing valve for a water dispensing assembly. More particularly, this invention relates to a water dispenser assembly having a self-closing cartridge valve.

Water dispenser assemblies traditionally include a handle that actuates a valve cartridge that proportionally controls the flow of water. A water dispenser is different than a common faucet assembly because hot water is immediately available upon actuation of the hot water handle. Actuation of a hot water handle communicates cold water through an outlet to a hot water source. Heated water from the hot water source is then communicated through a return conduit to the water dispenser. In a typical faucet, the water provided upon actuation of the hot water handle is not at a maximum temperature due to cooling within the hot water line connecting the faucet with the hot water source. However, a water dispenser provides water at the maximum desired temperature substantially immediately.

Immediate hot water can present a safety concern related to the immediate availability of hot water. In a typical faucet or water dispenser, a handle is moved to a position by an operator and remains in that position until closed or adjusted to a further open position. However, where safety concerns are present it may be desirable to provide for the automatic closing of the water dispenser to prevent continuously running hot water. An automatically closing faucet or water dispenser typically includes complex valveing that is hydraulically or electronically operated to automatically shut off water flow after a desired time. Further, some self-closing valveing require extensive modification to the housing to accommodate the desired self-closing features.

Typically, a water dispenser assembly includes a housing into which a valve cartridge is installed. The valve cartridge is typically a single compact unit assembled within the housing that is actuated by a handle. The cartridge is typically a standard part that is common to many different water-dispensing assemblies. Disadvantageously, any deviation from the operation or mounting of the cartridge valve is typically difficult to accommodate in a water dispenser assemblies. Therefore, for special applications, such as a self-closing faucet, modifications are required to provide the desired function at an additional cost and also with the requirement of modifying existing water dispenser assemblies.

Accordingly, it is desirable to develop a device that provides a self-closing function compatible with existing water dispenser assemblies and valve cartridges.

SUMMARY OF THE INVENTION

An example water dispensing assembly according to this invention includes a self-closing valve cartridge for automatically closing fluid flow.

The water dispensing assembly includes first and second valve cartridges. The water dispensing assembly includes a self-closing feature that provides for the automatic shut-off of fluid flow responsive to release of a handle. The self-closing feature is contained within the valve cartridge and includes a biasing spring that biases the stem toward a closed position.

An adapter holds the biasing member onto the stem. The adaptor fits over the stem and is secured in place by a screw. The adaptor is offset angularly relative to the stem prior to assembly to provide a preload bias toward the closed position. Corresponding features of the inner surface and the stem prevent the spring from rotating to a free state. The spring is held in the preload position and biases the stem and therefore the valve cartridge toward the closed position.

Accordingly, the water dispensing assembly of this invention provides a self-closing valve cartridge that provides a self-closing function compatible with existing water dispensing assemblies.

These and other features of the present invention can be best understood from the following specification and drawings, the following of which is a brief description.

BRIEF DESCRIPTION OF THE DRAWINGS

FIG. 5 is an exploded view of an example cartridge assembly including an adaptor according to this invention FIG. 6 is a perspective view of an assembled example self-closing cartridge assembly according to this invention.

DETAILED DESCRIPTION OF THE PREFERRED EMBODIMENT

Figure 1:
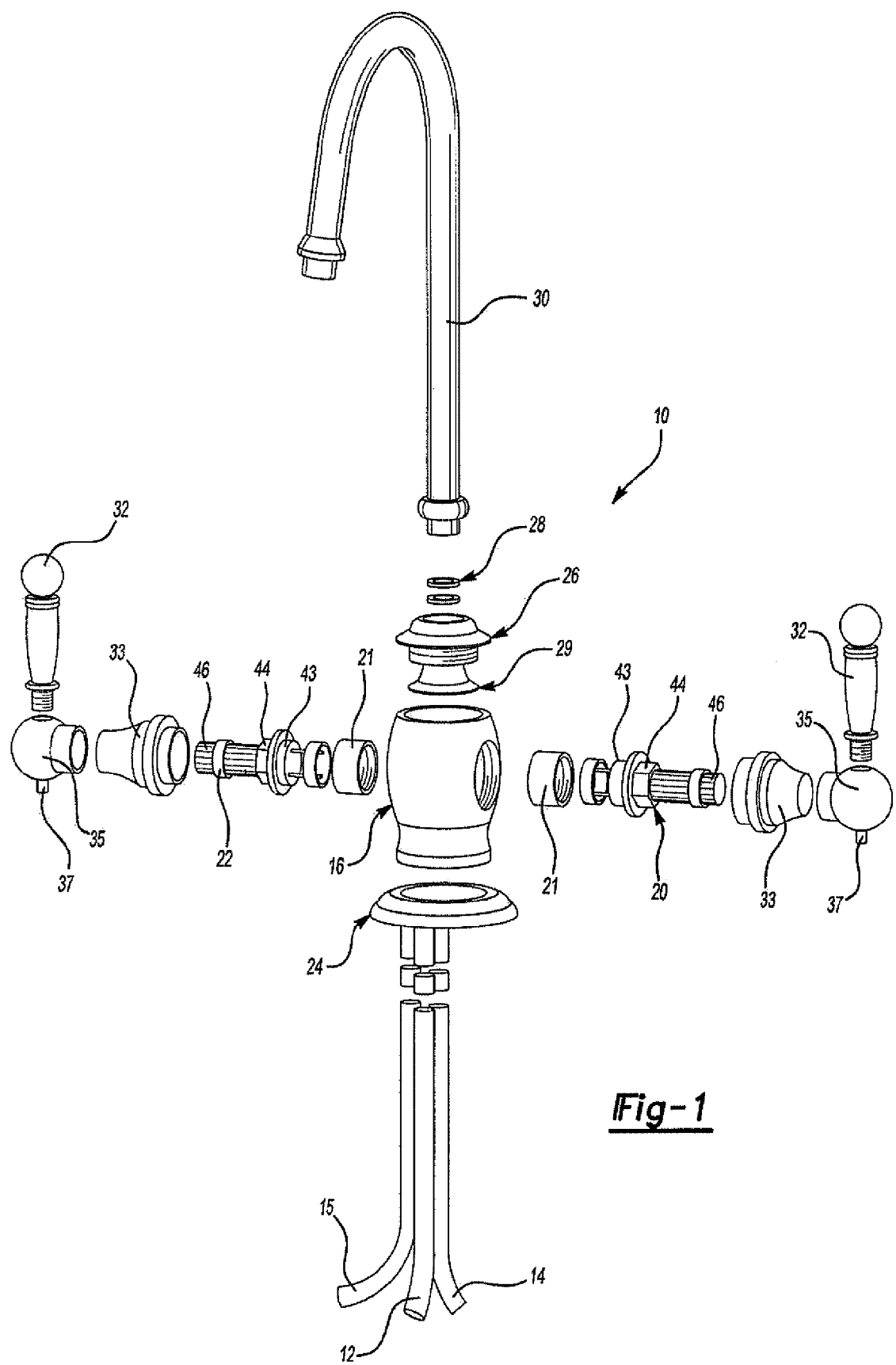
FIG. 1 is an exploded view of an example faucet assembly according to this invention.

Referring to FIG. 1 an example water dispensing assembly 10 includes a housing 16 for mounting first and second valve cartridges 20,22. The housing 16 includes conduits for a cold-water inlet 14, a supply line 15 and a hot water return 12 from a hot water source. A spout 30 is attached to the housing 16 by a retaining element 26 including seals 28 and 29. Cartridge holders 21 mount first and second valve cartridges assemblies 20, 22 within the housing 16. The first valve cartridge 20 controls the flow of cold water from the cold-water inlet 14 and the spout 30. The second valve cartridge 22 controls the flow of supply water to a hot water source and back through the return 12 and further to the spout 30. The example water dispensing assembly 10 includes handles 32 having a hub 35 and a bonnet 33 for concealing the valve cartridges 20, 22.

The example valve cartridges 20, 22 are ceramic valve cartridges as are known. Each valve cartridge 20,22 includes a rotatable stem 46 extending from a body 43. The body 43 includes a cartridge bonnet 44 having sides adapted for engaging a tool that provides for assembly of the valve cartridge 20,22 into the housing 16 and cartridge holder 21.

The example water dispensing assembly 10 includes a self-closing feature that provides for the automatic shut-off of flow of hot water responsive to release of the handle 32. The self-closing feature is contained within the second valve cartridge 22 and includes a biasing spring 34 that biases the stem 46 toward a closed position.

Figure 2:
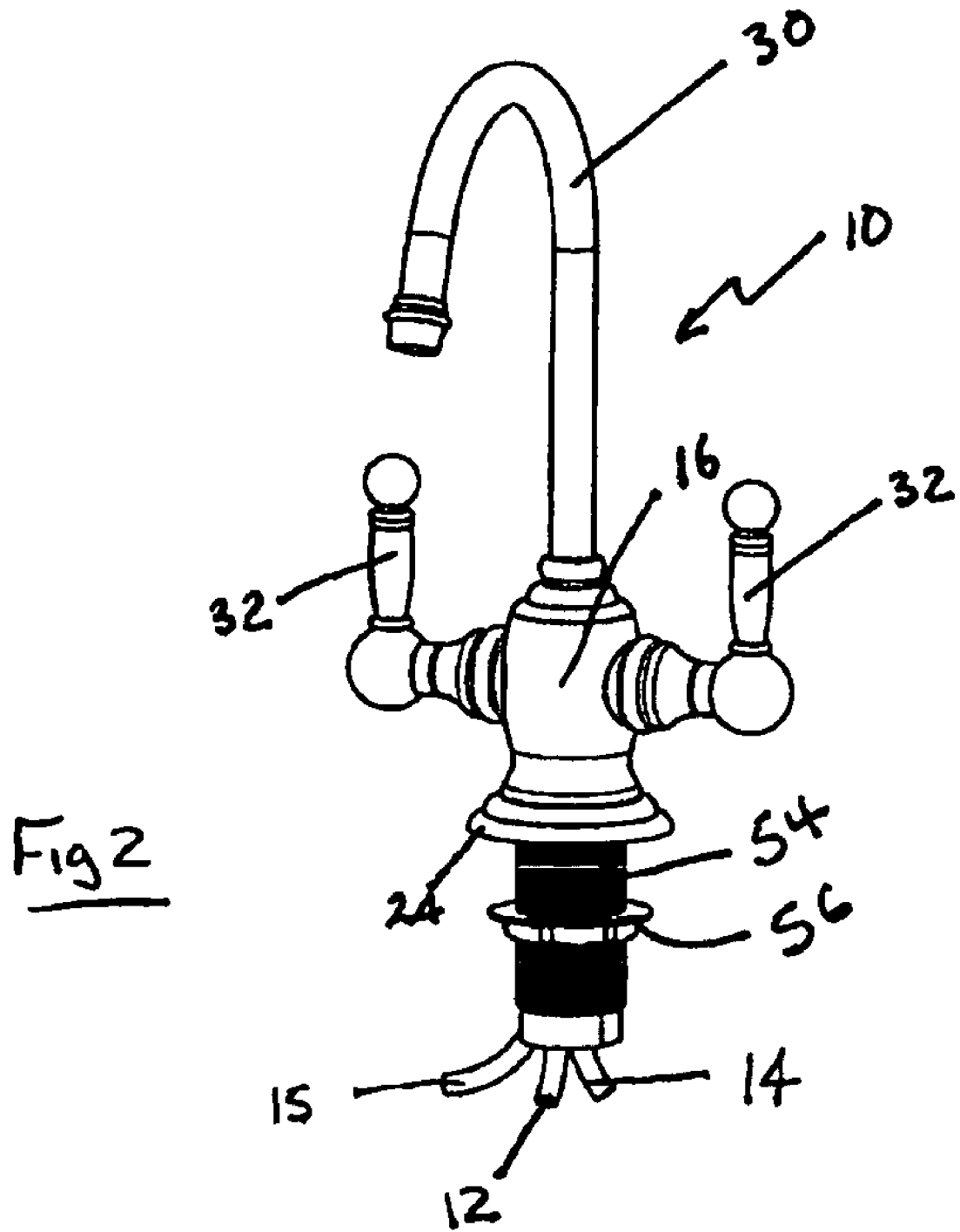
FIG. 2 is an assembled view of the example faucet assembly.

Referring to FIG. 2, the example water dispensing assembly 10 is shown completely assembled. The faucet assembly 10 includes the addition of a threaded sleeve 54 and nut 56 for mounting the faucet assembly 10 to a mounting surface. A worker with the benefit of this disclosure would understand that other water dispenser and faucet assembly configurations that utilize a valve cartridge are within the contemplation of this invention.

Figure 3:
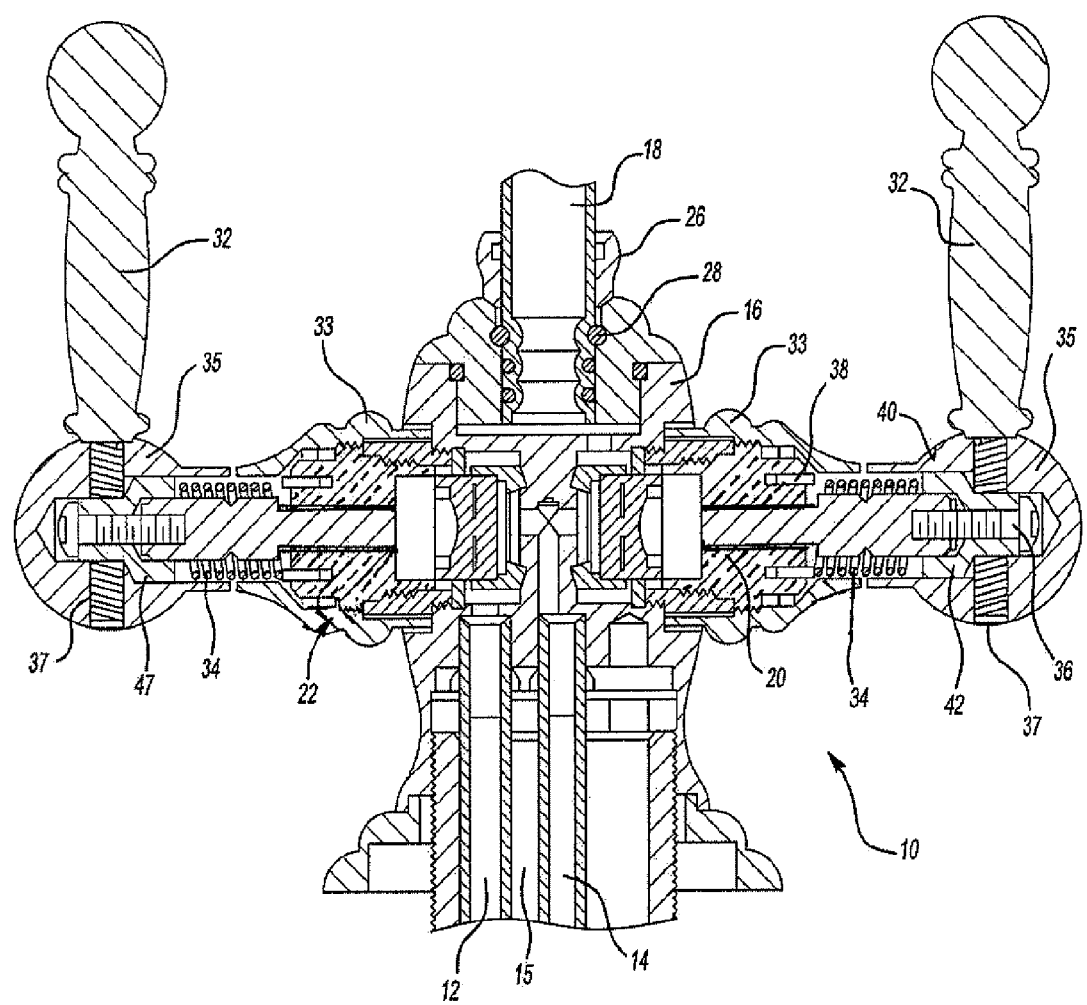
FIG. 3 is a cross-sectional view of the example faucet assembly

Referring to FIG. 3, a cross-section of the example water dispensing assembly 10 is shown including first and second valve cartridges 20, 22 that each include springs 34 to provide for self-closing of the valve cartridges 20, 22. The self-closing feature is contained entirely within the valve cartridges 20, 22 and therefore does not require any modification to the housing 16. The springs 34 are coil springs that fit around the stem 46. Adapters 42 hold the springs 34 onto the stem 46. Each of the adaptors 42 fit over respective stems 46 and is secured in place by a screw 36. The example assembly 10 includes self-closing features for both the first and second valve cartridges 20, 22 such that both the cold and hot water are automatically closed upon release of the respective handle 32. Each of the hubs 35 for the handles 32 mounts to the respective adaptor 42 and is secured in place by setscrews 37.

Figure 4:
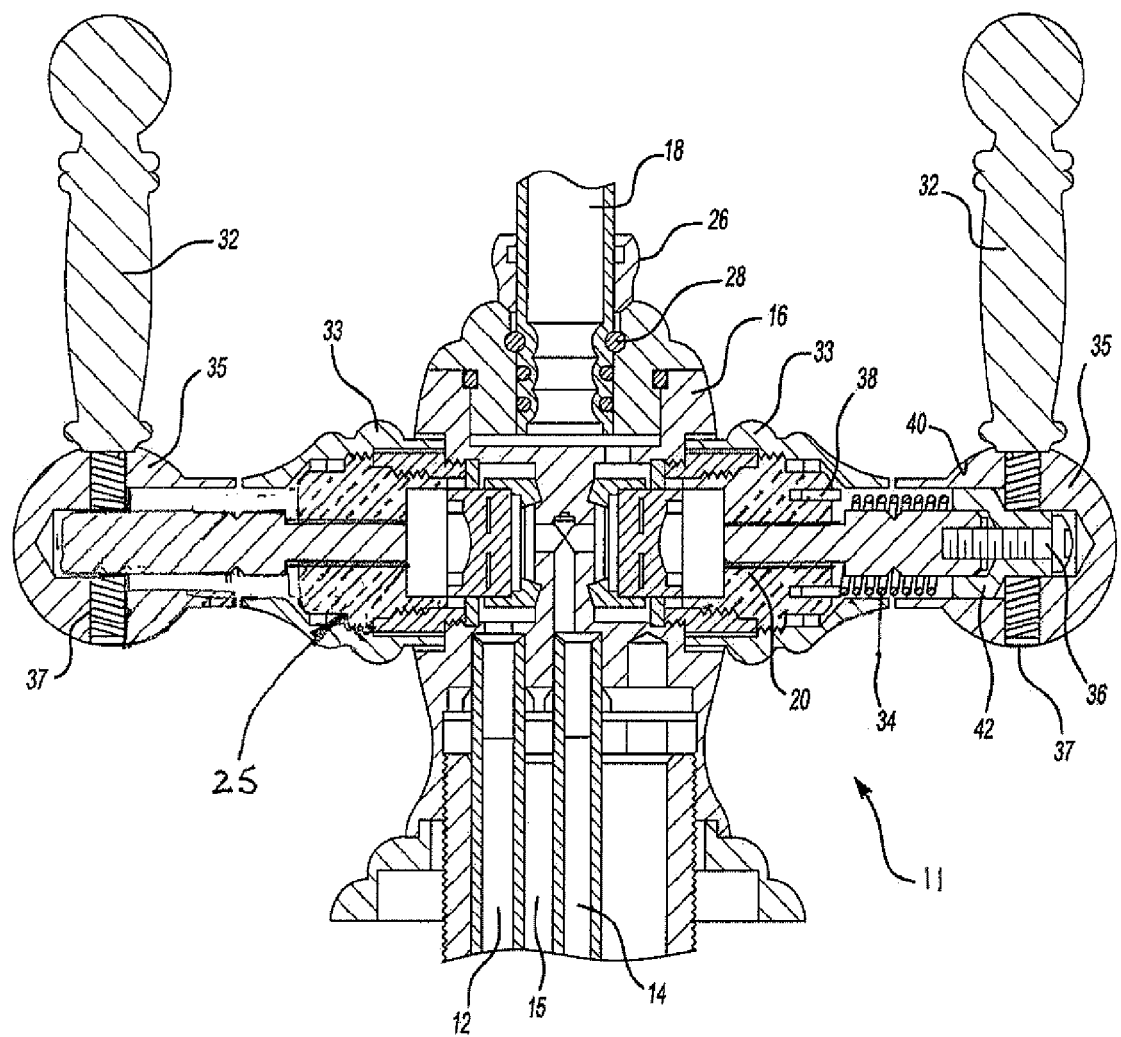
FIG. 4 is another cross-sectional view of the example faucet with an example self-closing cartridge assembly disposed only on a hot water side.

Referring to FIG. 4 another example water dispensing assembly 11 includes the adaptor 42 and spring 34 for the first cartridge 20 that controls a flow hot water. A second cartridge 25 does not include and adaptor or spring. Only the first cartridge 20 includes the adaptor 42 and spring 34 to bias the first cartridge control of hot water toward a closed position.

Referring to FIGS. 5 and 6, an example valve cartridge 22 is shown and includes the stem 46 extending from the body 45. The body 45 includes the valveing that provides for control of fluid flow upon rotation of the stem 46. The stem 46 is rotatable between an open position and a closed position and includes an outer surface comprising a plurality of splines 47. The body 45 includes the cartridge bonnet 44 that has a blind hole 38 for receiving a first end 51 of the spring 34. The spring 34 includes a plurality of coils 52 that fit over and around the stem 46. The coils 52 are configured such that actuation of the handle 32 winds the coil. The coil 52 is therefore wound in a direction required for each handle 32. A second end 50 of the spring 34 is received within a second through hole 40 within the adaptor 42. The adaptor 42 includes an inner surface 49 with broaching keyed to correspond with the splines 47 on the stem 46. The corresponding locking features of the inner surface 49 and the splines 47 provide for positive location of the adaptor onto the stem 46.

The self-closing valve cartridge 22 is assembled by inserting the first end 51 of the spring 34 into the blind hole 38. The second end 50 of the spring 34 is received within the through hole 40. The first end 51 of the spring 34 is therefore secured to a fixed portion of the valve cartridge 22 and the second end of the spring 50 is secured to move with the rotatable stem 46. The first and second ends 50, 51 of the spring 34 extend axially from the coil 52. The second end 50 of the spring 34 is longer than the first end 51 such that the adaptor 42 can engage the spring 34 and be twisted relative to the stem 46. The adaptor 42 is twisted relative to the stem 46 prior to assembly to provide a bias on the stem 46 toward the closed position. Once the adaptor 42 is assembled to the stem 46, any excess spring material extending through the opening 40 is removed. The corresponding features of the inner surface 49 and the stem 46 prevent the spring 34 from rotating to a free state. Instead, once the adaptor 42 is mounted to the stem 46, the spring 34 is held in a loaded position where the spring 34 biases the stem 46 and therefore the valve cartridge in the closed position.

The adaptor 42 is held onto the stem 46 by the screw 36 with the spring 34 at an angular deflection to produce the desired preload for holding and biasing the valve cartridge 20 in the closed position. Operation of the faucet assembly 10 by turning the handle 32 increase the load exerted by the spring 34. Upon release of the handle 32 the spring 34 rotates the handle 32 back to the closed position. The preset preload on the spring 34 maintains a desired amount of pressure on the valve cartridge 22 to maintain the closed position.

The valve cartridge assembly 22 of this invention provides a compact and contained assembly for providing a self-closing faucet assembly 10. The self-closing valve cartridge assembly 22 can be installed into any faucet assembly 10 without modification. Further, the adapter 42 provides for the installation of the spring to any configuration of valve cartridge, such that any known valve cartridge may be used to provide the desired self-closing feature.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A water dispensing assembly comprising:
   a housing defining an inlet and an outlet for fluid;
   a valve cartridge assembly disposed within said housing for controlling flow of fluid between said inlet and said outlet, said valve cartridge assembly operable by rotation of a stem extending from a body, said stem rotatable between a closed position preventing water flow and an open position allowing water flow;
   an adaptor assembled to said stem, wherein said adaptor includes an inner surface keyed to said stem for preventing relative movement between said stem; and
   a coil spring including a plurality of coils surrounding said stem and secured to said adaptor for biasing said stem toward said closed position.

2. A water dispensing assembly comprising:
   housing defining an outlet and an outlet for fluid;
   a valve cartridge assembly disposed within said housing for controlling flow of fluid between said inlet and said outlet, said valve cartridge assembly operable by rotation of a stem extending from a body, said stem rotatable between a closed position preventing water flow and an open position allowing water flow;
   an adaptor assembled to said stem; and
   a spring secured to said adaptor for biasing said stem toward said closed position, wherein said stem includes a splined outer surface and said adaptor includes an inner surface corresponding to said splined outer surface of said stem for preventing relative movement between said stem and said adaptor.

3. The assembly as recited in claim 1, wherein said body includes a first opening for receiving a first end of said adaptor includes a second opening for receiving a second end of said spring.

4. The assembly as recited in claim 1 including a fastener extending through said adaptor and into said stem for holding said adaptor onto said stem.

5. The assembly as recited in claim 1 wherein said adaptor includes an outer splined surface engageable to a handle.

6. A water dispensing assembly comprising:
   a housing defining an inlet and an outlet for fluid;
   a valve cartridge assembly disposed within said housing for controlling flow of fluid between said inlet and said outlet, said valve cartridge assembly operable by rotation of a stem extending from a body, said stem rotatable between a closed position preventing water flow and an open position allowing water flow;

an adaptor assembled to said stem; and a spring secured to said adaptor for biasing said stem toward said closed position, wherein said faucet assembly includes a first valve cartridge for a hot water inlet and a second valve cartridge for a cold water inlet, wherein only said first valve cartridge includes said adaptor and said spring for biasing said stem toward said closed position.

7. A self-closing valve cartridge assembly comprising:

a valve stem rotatable between an open position allowing fluid flow and a closed position preventing fluid flow;

an adaptor mounted to rotate with said valve stem, said adaptor including a key corresponding with said valve stem to prevent relative rotation of said adaptor and said valve stem; and a coil spring including a plurality of coils surrounding sad valve stem and having a first end fixed to a body of said valve cartridge and a second end fixed to said adaptor for rotation with said valve stem, said coil spring biasing rotation of said valve stem toward said closed position.

8. The assembly as recited in claim 7 wherein said body includes a first opening for receiving said first end of said biasing member and said adaptor includes a second opening for receiving said second end of said biasing member.

* * * * *

UNITED STATES PATENT AND TRADEMARK OFFICE
CERTIFICATE OF CORRECTION

PATENT NO. : 7,264,016 B2  
APPLICATION NO. : 10/973214  
DATED : September 4, 2007  
INVENTOR(S) : Molina et al.

Page 1 of 1

It is certified that error appears in the above-identified patent and that said Letters Patent is hereby corrected as shown below:

Claim 1, Column 4, line 31: insert --said adaptor and-- after "between" and before "said"

Claim 2, Column 4, line 36: first occurence of "outlet" should read as --inlet--

Claim 3, Column 4, line 53: insert --spring and said-- before "adaptor"

Claim 7, Column 6, line 3: "sad" should read as --said--

Signed and Sealed this

Twenty-seventh Day of November, 2007

JON W. DUDAS  
*Director of the United States Patent and Trademark Office*